United States Patent [19]
Herrmann et al.

[11] Patent Number: 5,584,060
[45] Date of Patent: Dec. 10, 1996

[54] CIRCUIT ARRANGEMENT FOR DERIVATION OF A SIGNAL DEPENDENT ON THE CHANGE DIRECTION OF THE INCOMING SIGNAL LEVEL

[75] Inventors: Matthias Herrmann; Lothar Vogt, both of Hildesheim; Juergen Kaesser, Diekholzen, all of Germany

[73] Assignee: Blaupunkt-Werke GmbH, Hildesheim, Germany

[21] Appl. No.: 343,415

[22] PCT Filed: Mar. 22, 1994

[86] PCT No.: PCT/DE94/00317

§ 371 Date: Mar. 6, 1994

§ 102(e) Date: Mar. 6, 1994

[87] PCT Pub. No.: WO94/22226

PCT Pub. Date: Sep. 29, 1994

[30] Foreign Application Priority Data

Mar. 24, 1993 [DE] Germany .................... 43 09 518.6

[51] Int. Cl.$^6$ ............................................ H04B 1/18
[52] U.S. Cl. ........................... 455/161.3; 455/185.1
[58] Field of Search ..................... 455/161.3, 134, 455/184.1, 185.1, 186.1, 187.1, 226.2, 277.2, 133, 135, 277.1, 275, 140

[56] References Cited

U.S. PATENT DOCUMENTS

| 4,633,519 | 12/1986 | Gotoh et al. | 455/134 |
| 4,868,885 | 9/1989 | Perry | 455/226.2 |
| 5,390,357 | 2/1995 | Nobusawa et al. | 455/134 |

FOREIGN PATENT DOCUMENTS

0507096A2  10/1992  European Pat. Off. .

Primary Examiner—Reinhard J. Eisenzopf
Assistant Examiner—Marsha D. Banks-Harold
Attorney, Agent, or Firm—Kenyon & Kenyon

[57] ABSTRACT

In a circuit arrangement for deriving a signal dependent on the change direction of the incoming signal level in a radio receiver, controllable by a microcomputer, a comparator is provided outside the microcomputer to which a signal representing the respective signal strength and a signal generated by the microcomputer representing the signal strength at an earlier point in time can be supplied. An output signal from the comparator can be supplied to the microcomputer.

12 Claims, 1 Drawing Sheet

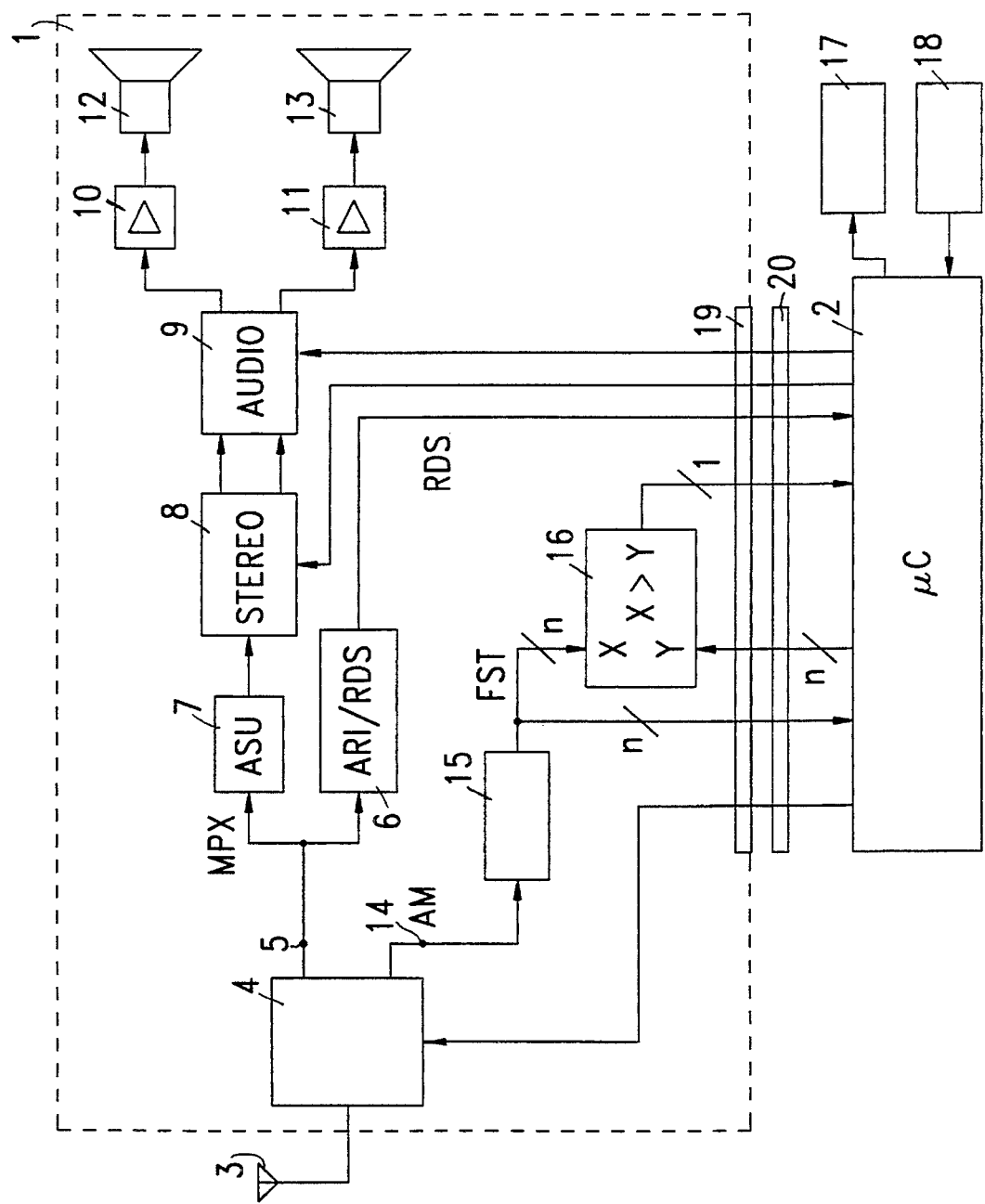

CIRCUIT ARRANGEMENT FOR DERIVATION OF A SIGNAL DEPENDENT ON THE CHANGE DIRECTION OF THE INCOMING SIGNAL LEVEL

FIELD OF THE INVENTION

The present invention concerns a circuit arrangement for deriving a signal dependent on the change direction of the incoming signal level in a radio receiver controllable by a microcomputer.

BACKGROUND INFORMATION

Radio receivers are increasingly being controlled by microcomputers, with evaluation of a signal representing the signal level also being performed. Such a signal is derived, for example, by amplitude demodulation followed by low-pass filtration of the FM intermediate frequency signal. Following further processing by the microcomputer, a signal strength signal of this kind is used to reduce stereo channel separation or volume when noise occurs and to select one of several transmitters broadcasting the same program. Processing the signal strength signal in the microcomputer, especially determining the change direction, entails computing cost.

The goal of the present invention is to derive a signal as a function of the change direction of the incoming signal level, using minimum computing power.

SUMMARY OF THE INVENTION

This goal is achieved according to the present invention by providing a comparator outside the microcomputer to which a signal representing the respective signal strength and a signal generated by the microcomputer and representing the signal strength at an earlier point in time are supplied, and by an output signal from the comparator being supplied to the microcomputer.

Reducing the computer power required for direction determination of the change in signal strength makes it possible to use the freed capacity of the microcomputer to a greater extent for other functions.

One improvement on the circuit arrangement according to the present invention consists of the signal representing the signal strength at an earlier point in time and the comparator output signal being transmitted through a serial peripheral interface (SPI) between the comparator and the microcomputer. Such an interface is especially advantageous in radio receivers with a high degree of integration, for communication of the microcomputer with the radio receiver.

The advantage of the circuit arrangement according to the present invention, namely the saving in computing power, becomes particularly clear in one advantageous embodiment of the present invention in which the signals representing the signal strength are delivered with a resolution of 16 binary digits. This saves a computer operation of two 16-bit words, which in any event serves only to obtain a 1-bit information signal.

One especially advantageous use of the circuit arrangement according to the present invention consists of testing the signal strengths of alternative transmitters to which the radio receiver is switched for sampling.

During sampling reception of alternative frequencies, only an extremely short time of less than 100 ms for example, is available in order to prevent this sampling reception from causing any audible noise if possible. This time contains various time segments that are not useable for testing, for example the duration of transients in tuner 4, so that only a very short time is required to determine whether the alternative transmitter is being received at a higher signal strength. The circuit arrangement according to the present invention is therefore capable of very rapidly generating a signal corresponding to the direction change.

BRIEF DESCRIPTION OF THE DRAWING

The Figure shows one embodiment of a circuit arrangement according to the present invention.

DETAILED DESCRIPTION OF THE INVENTION

The figures drawing shows essential parts of a radio receiver 1, especially those parts required to explain the function of the circuit arrangement according to the present invention within the radio receiver. In addition, the drawing shows a microcomputer 2 that controls radio receiver 1. Individual circuit blocks within radio receiver 1. constitute functional groups known of themselves. However, it is not necessary within the framework of the present invention to make these functional groups discrete modules as well. With a very high degree of integration, it is also possible to accomplish complete digital signal processing of the receiver in one integrated circuit, including signal processing steps such as filtration or nonlinear weighting, by computer operations. In addition, digital signal processors and other digital circuits, such as shift registers, flip-flops, etc., can be jointly provided with an integrated circuit to produce a receiver with the circuit arrangement according to the present invention.

The signal received through an antenna 3 is amplified, selected, and demodulated in a tuner 4 in a manner known of itself. A demodulated multiplex signal MPX can be obtained from an output 5 of tuner 4, said signal being supplied to a traffic radio/RDS decoder 6 and an automatic noise suppression circuit 7. A stereo decoder 8 and an audio processor 9 are connected thereto. The audio signals obtained are reproduced in a manner known of itself with the aid of two output stages 10, 11 and two speakers 12, 13. Radio data signals RDS generated by traffic radio/RDS decoder 6 are supplied to microcomputer Tuner 4 has another output 14 at which an AM signal, resulting from amplitude demodulation of the FM intermediate frequency signal, is obtained. This is conducted to a low-pass filter 15, at whose output an n-bit-wide signal strength signal is obtained. This is supplied to microcomputer 2 and one input X of a comparator 16. Another input Y of the comparator receives a similar n-bit-wide signal from the microcomputer, representing the signal strength at a previous point in time. One output of comparator 16 delivers a 1-bit-wide signal depending on whether X>Y. This is supplied to microcomputer 2.

In the case of the radio receiver shown, microcomputer 2 serves to control various processes, especially tuning to the received transmitter through a PLL circuit, provided in tuner 4 but not shown, and controlling stereo decoder 8 and audio processor 9, so that depending on signal strength signal FST, the volume is reduced and a switch is made from stereo to mono. Microcomputer 2 is also connected with a display device 17 and a control 18.

When a small signal strength signal FST indicates to microcomputer 2 that the transmitter being received at the moment is coming in more weakly, another transmitter (alternative transmitter) is selected for sampling by microcomputer 33, with the microcomputer determining from radio data signal RDS whether the alternative transmitter is broadcasting the same program. This process is known of itself and need not be explained in greater detail for an understanding of the circuit arrangement according to the present invention. If the alternative transmitter is received with a lower signal strength than the transmitter received previously, the circuit immediately switches back to the transmitter received previously.

However, if the signal strength is greater, the system remains tuned to the alternative transmitter.

This process takes place approximately as follows in the circuit arrangement according to the present invention: during reception of a transmitter, signal strength signal FST is constantly sampled by microcomputer 2. If the signal drops below a preset value, the microcomputer directs tuner 4 to tune to a different frequency. During reception of this frequency or transmitter, the last value of signal strength signal FST prior to switching is supplied by the microcomputer to input Y of comparator 16. Comparator 16 then informs microcomputer 2 whether the received signal strength of the alternative transmitter is higher or lower. In addition, microcomputer 2 receives through traffic radio/ RDS decoder 6, information indicating whether the alternative transmitter is broadcasting the same program. After evaluating this information, microcomputer 2 decides whether the alternative transmitter or the transmitter received previously is to be received.

Data transfer between radio receiver 1 and microcomputer 2 can advantageously be provided by serial peripheral interfaces (SPI) 19, 20, merely indicated in the drawing. Transfer between the interfaces is accomplished with the aid of a serial bus system. For the sake of clarity, these details have not been shown. Suitable interfaces are available commercially, for example model MC68HC11E9 made by Motorola.

What is claimed is:

1. A circuit arrangement for deriving an output signal as a function of a change in an incoming signal level of a radio signal received in a radio receiver controlled by a microcomputer, comprising:

a comparator external to said microcomputer having a first input, a second input and an output, wherein the first input is coupled to the microcomputer for receiving a signal representing the incoming signal level of the radio signal received in the radio receiver at a first time, the second input is coupled to the radio receiver for receiving a signal representing the incoming signal level of the radio signal received in the radio receiver at a second time, the first time being earlier than the second time, and the output is coupled to the microcomputer and provides the output signal to the microcomputer, the output signal being determined as a function of the first input and the second input and indicating the change in the incoming signal level of the radio signal received in the radio receiver.

2. The circuit arrangement according to claim 1, wherein the output signal has a first value when the incoming signal level received in the radio receiver at the second time is greater than the incoming signal level received from the radio receiver at the first time, and the output signal has a second value when the incoming signal level received in the radio receiver at the second time is at least as small as the incoming signal level received in the radio receiver at the first time.

3. The circuit arrangement according to claim 2, wherein the first input and the output are coupled to the microcomputer via a serial peripheral interface.

4. The circuit arrangement according to claim 2, wherein the incoming signal level of the radio signal received in the radio receiver at the first time and at the second time each include a resolution of 16 binary digits.

5. The circuit arrangement according to claim 1, wherein the radio receiver receives the incoming signal level of the radio signal from at least two transmitters which are sampled by the radio receiver, so that the radio receiver tests the incoming signal level of the at least two transmitters.

6. A circuit arrangement for deriving an output signal as a function of a difference between first and second incoming signal levels of a radio signal received in a radio receiver controlled by a microcomputer, comprising:

a radio receiver circuit for receiving the radio signal, detecting the first and second incoming signal levels of the radio signal at a first time and a second time, respectively, the first time being earlier than the second time, and providing a signal representing the first incoming signal level to the microcomputer at the first time; and a comparator circuit external to said microcomputer coupled to the radio receiver circuit, the comparator circuit having a first input, a second input and an output, wherein the first input is coupled to the microcomputer for receiving the signal representing the first incoming signal level of the radio signal at the first time, the second input is coupled to the radio receiver for receiving a signal representing the second incoming signal level of the radio signal received in the radio receiver at the second time, and the output is coupled to the microcomputer and provides the output signal to the microcomputer, the output signal being determined as a function of the first input and the second input and indicating the difference between the first and second incoming signal levels of the radio signal received in the radio receiver.

7. The circuit arrangement according to claim 6, wherein the output signal has a first value when the second incoming signal level of the radio signal at the second time is greater than the first incoming signal level of the radio signal at the first time, and the output signal has a second value when the second incoming signal level of the radio signal at the second time is at least as small as the first incoming signal level of the radio signal at the first time.

8. A method for detecting a change in an incoming signal level of a radio signal received in a radio receiver controlled by a microcomputer, comprising:

receiving the radio signal in a radio receiver circuit;

detecting the incoming signal level of the radio signal at at least a first time and a second time, the first time being earlier than the second time;

providing the incoming signal level at the first and second times to a comparator circuit external to said microcomputer having an output signal determined as a function of the incoming signal level at the first and second times; and providing the output signal to the microcomputer indicating the change in the incoming signal level of the radio signal received in the radio receiver.

9. The method according to claim 8, wherein the step of providing the incoming signal to the comparator circuit includes the steps of:

providing the incoming signal level of the radio signal at the first time to the microcomputer;

coupling the microcomputer to a first input of the comparator circuit for providing the incoming signal level at the first time to the first input; and coupling the receiver circuit to a second input of the comparator circuit for providing the incoming signal level of the radio signal at the second time to the second input.

10. The method according to claim 9, wherein the incoming signal level of the radio signal at the first time and the output signal are provided to the microcomputer via a serial peripheral interface.

11. The method according to claim 8, wherein the incoming signal level includes a resolution of 16 binary digits.

12. The method according to claim 8, further comprising the step of:

testing the incoming signal level of the radio signal from at least two transmitters which are sampled by the radio receiver.

* * * * *